US008434076B2

(12) United States Patent
Novoselsky et al.

(10) Patent No.: US 8,434,076 B2
(45) Date of Patent: Apr. 30, 2013

(54) EFFICIENT COMPILATION AND EXECUTION OF IMPERATIVE-QUERY LANGUAGES

(75) Inventors: Anguel Novoselsky, Foster City, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1125 days.

(21) Appl. No.: 11/954,757

(22) Filed: Dec. 12, 2007

(65) Prior Publication Data

US 2009/0158262 A1 Jun. 18, 2009

(51) Int. Cl.
*G06F 9/45* (2006.01)

(52) U.S. Cl.
USPC ........... 717/154; 717/136; 717/140; 717/150; 717/160

(58) Field of Classification Search ........................ None
See application file for complete search history.

(56) References Cited

U.S. PATENT DOCUMENTS

| | | | | |
|---|---|---|---|---|
| 4,931,928 A * | 6/1990 | Greenfeld | ...................... | 717/131 |
| 4,989,132 A * | 1/1991 | Mellender et al. | ............. | 717/139 |
| 5,093,916 A * | 3/1992 | Karp et al. | ..................... | 719/331 |
| 5,168,554 A * | 12/1992 | Luke | ............................... | 715/209 |
| 5,361,357 A * | 11/1994 | Kionka | .......................... | 717/151 |
| 5,687,375 A * | 11/1997 | Schwiegelshohn | ........... | 717/129 |
| 5,721,928 A * | 2/1998 | Umehara et al. | ............... | 717/149 |
| 5,815,713 A * | 9/1998 | Sanders | ......................... | 717/106 |
| 5,903,761 A * | 5/1999 | Tyma | .............................. | 717/148 |
| 6,111,578 A * | 8/2000 | Tesler | ............................ | 715/850 |
| 6,145,121 A * | 11/2000 | Levy et al. | ..................... | 717/135 |
| 6,275,981 B1 * | 8/2001 | Buzbee et al. | ................. | 717/158 |
| 6,427,234 B1 * | 7/2002 | Chambers et al. | ............. | 717/140 |
| 6,526,455 B1 * | 2/2003 | Kamimura | ..................... | 719/316 |
| 6,628,304 B2 * | 9/2003 | Mitchell et al. | ................ | 715/734 |
| 7,210,097 B1 * | 4/2007 | Clarke et al. | ................... | 715/227 |
| 7,376,716 B2 * | 5/2008 | Dilley et al. | .................... | 709/219 |
| 7,657,877 B2 * | 2/2010 | Vorbach et al. | ................ | 717/141 |
| 7,707,563 B2 * | 4/2010 | Wei | ................................ | 717/140 |
| 7,778,966 B2 * | 8/2010 | Balassanian | ................... | 707/610 |
| 7,779,020 B2 * | 8/2010 | Grust et al. | .................... | 707/760 |
| 7,823,117 B1 * | 10/2010 | Bennett | ............................ | 703/13 |
| 7,917,890 B2 * | 3/2011 | Barcellona | ..................... | 717/106 |
| 7,934,207 B2 * | 4/2011 | Gustafsson et al. | ........... | 717/143 |

(Continued)

OTHER PUBLICATIONS

Title: Compiler-Supported Simulation of Highly Scalable Parallel Applications, author: Adve et al, source: IEEE, dated: 1999.*

(Continued)

*Primary Examiner* — Chameli Das
(74) *Attorney, Agent, or Firm* — Hickman Palermo Truong Becker Bingham Wong LLP (57) ABSTRACT

A system which combines sequential and iterative source code is provided. The system decides which type of processing would be most suitable for all portions of the source code, regardless of type. The system can adjust that decision based on the specific nature of the constructs within the source code, and can also adjust that decision based on the platform upon which the resulting executable program will run.

22 Claims, 3 Drawing Sheets

U.S. PATENT DOCUMENTS

| | | | |
|---|---|---|---|
| 2002/0113816 A1* | 8/2002 | Mitchell et al. | 345/734 |
| 2003/0065828 A1* | 4/2003 | Danan | 709/328 |
| 2004/0205738 A1* | 10/2004 | Yoshida et al. | 717/150 |
| 2005/0216899 A1* | 9/2005 | Muthukumar et al. | 717/151 |
| 2005/0235274 A1* | 10/2005 | Mamou et al. | 717/136 |
| 2005/0262041 A1* | 11/2005 | Beust et al. | 707/1 |
| 2006/0005176 A1* | 1/2006 | Kawahara et al. | 717/149 |
| 2008/0134158 A1* | 6/2008 | Salz et al. | 717/148 |
| 2009/0300590 A1* | 12/2009 | Moritz | 717/140 |
| 2010/0023537 A1* | 1/2010 | Danan | 707/100 |

OTHER PUBLICATIONS

Title: Executing a program on the MIT tagged-token dataflow architecture, author: Arvind; Nikhil,et al, source: IEEE, dated: 1990.*

Jain, V.J., "Managing Complex XML data in Oracle XML DB 11g", Oracle Technology Network, published Dec. 2007, 6 pages.

Oracle, "Developing Applications with the Oracle Call Interface Release 8.0", Oracle Technology Network, White Paper, May 5, 1997, 8 pages.

* cited by examiner

EFFICIENT COMPILATION AND EXECUTION OF IMPERATIVE-QUERY LANGUAGES

FIELD OF THE INVENTION

The present invention relates to a system which combines imperative/sequential source code with iterative/query source code. The system decides which type of processing would be most suitable for all of the source code, and can adjust that decision based on the platform upon which the resulting program will run.

BACKGROUND

Computer languages specifically designed for querying and data retrieval within databases and information systems are known as query languages. A majority of query languages are declarative, in that they specify a goal to be achieved, but don't specify how to achieve it.

Query language processors, especially database ones, often deal with large (potentially infinite) volumes of data. Collecting all of the queried data in one step often requires a lot of memory and processor resources, and in some cases infinite, can be impossible. This is why some query processors use lazy evaluation (retrieving only one data item in a step) as a main evaluation paradigm.

Meanwhile, imperative languages like C and JAVA explicitly describe the computation as a sequence of steps called statements. Since many imperative languages use procedures or functions they are also called procedural. Because imperative languages are executed in sequence, they are also known as sequential. Imperative (procedural) sequential language programs are compiled into a sequence of atomic instructions. At each step, only one instruction is executed, but after the previous instruction execution is finished and all of the resulting data is collected and stored, the program state is permanently changed. Imperative languages are designed for data processing, but are not well-suited for querying.

Languages that combine both imperative and declarative (query) portions are known as hybrid languages. PL/SQL is one example, where declarative SQL language is embedded into an imperative procedural language. One problem with existing imperative-query languages is that persons writing the code must explicitly demarcate the boundary between the sequential and SQL portions of the source code. A compiler is not involved in locating the demarcation. This is because the imperative and query languages are separate, where each is handled by its own compiler.

Where more than one compiler is used, it is not possible to apply global optimization during the compilation process. Also, the boundary between imperative versus declarative is decided completely by the person writing the source code, regardless of where the resulting program may execute. An additional limitation occurs at run-time. An imperative processor is designed to do collect all data before executing a next step in a sequence. Accordingly, the imperative processor cannot benefit from data retrieval techniques often associated with query languages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A system which compiles sequential and SQL constructs within a single source code file achieves improved efficiency. The system decides whether to compile the source code into byte code, or iteratively evaluate the source code and locate it within a data object. Performance improvement can be achieved if specific sequential constructs are compiled into iterative ones, or vice versa.

Definitions

There are several different ways of describing the same type of computer program flow. Three examples of program flow terms that have similar meanings are imperative, sequential, and procedural, all of which mean to process source code segments in sequence, and do not begin one segment until the previous step is entirely completed. Within this specification, the term "sequential" will be intended to suffice for the combination of all of these terms. The use of "sequential" should thus not be construed to exclude imperative or procedural.

Similarly, the terms iterative and declarative have similar meaning with regard to program flow. Consequently, the term "iterative" will be used herein, but will be understood to not exclude declarative.

Finally, the term "source code" will mean those combinations of text, symbols, directives, and constructs authored by a user that are either sequentially compiled or iteratively evaluated as part of a query. In either case, the source code is processed to result in an executable program.

Iterative Logic and Sequential Logic

Figure 1A:
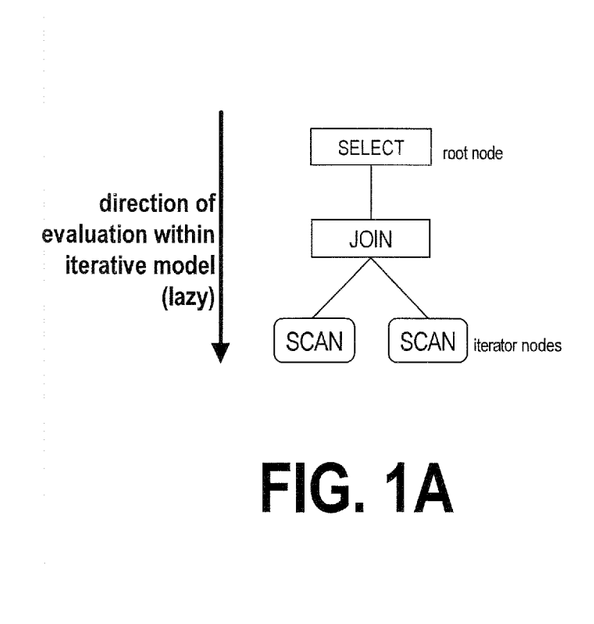
FIGS. 1A and 1B are examples of procedural and sequential constructs, respectively.

A typical query is shown in FIG. 1A, in which various SQL directives are compiled into tree-like structures having a root node which branches into various iterator nodes. Although the specific SQL constructs SELECT, JOIN, and SCAN are shown in FIG. 1A, these are but for example purposes only, and should not be considered as limiting exclusively thereto. Within the model of FIG. 1A, query evaluation starts from the root node and persists in walking the tree until a new data item is received in the root node. SQL directives are not sequentially executed, as SQL directives have no beginning and no end. Depending on how some of the SQL constructs get evaluated, other of the SQL constructs may never need to be evaluated.

SQL constructs use an iterative processing model. An iterative processing model uses lazy evaluation, which does not compute all results of the SQL constructs or directives ahead of time, and in some cases determines that various of the SQL constructs can be ignored and thus never processed. Instead, as shown in FIG. 1A, iterative processing may compute one row at a time, and may fetch rows one row at a time, continually passing downwards (walking) the tree.

Figure 1B:
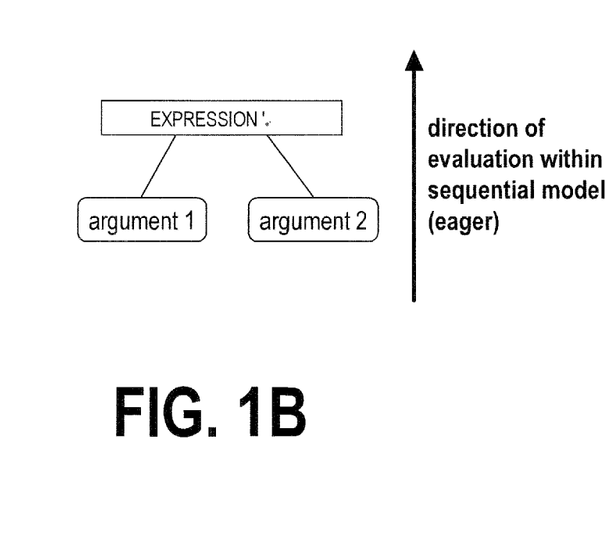

In contrast, FIG. 1B shows an example of sequential processing mode, which results in byte code. Within FIG. 1B, the system 200 generates code to evaluation argument 1, then argument 2, then the expression 'e' itself. These evaluations then get stored as byte code. Procedural logic uses eager evaluation, which is the opposite of lazy evaluation. Within eager evaluation, all arguments (e.g. arguments 1 and 2 in FIG. 1B) get fully evaluated before computing the parent expression, whether such evaluation is necessary or not. The end result is a single atomic instruction stored in memory. Sequential constructs are executed in order, one instruction at a time. Unlike iterative (SQL) processing, sequential processing does not go up and down a tree. Instead, sequential processing evaluates one piece of logic at a time, and does not return until all pieces are completed. If a sequential construct cannot be evaluated, the compiler will flag an error and refuse to go further.

Contrasting FIGS. 1A and 1B brings out a clear distinction. Lazy evaluation is performed "top down", and eager evaluation is performed "bottom up".

Explanation of System

Figure 2:
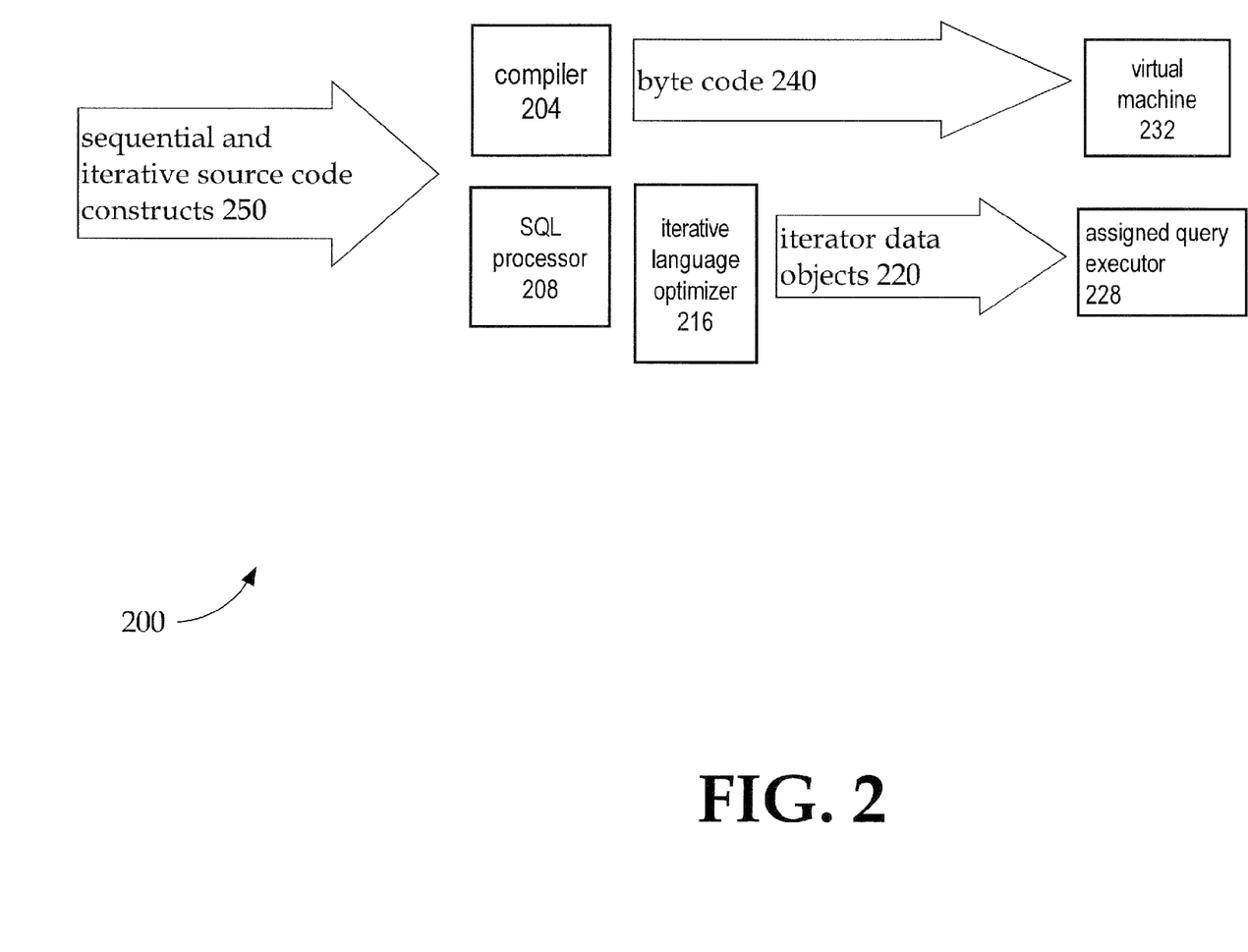
FIG. 2 is a block diagram of an embodiment of the invention.

A combination sequential and iterative language system 200 is shown in FIG. 2. The system 200 manages source code containing both sequential and iterative constructs. The system 200 manages source code efficiently using global optimization at compile-time, combines both eager and lazy evaluation in a single executable program, and uses dynamic optimization at run-time.

A system 200 is shown in FIG. 2. The system 200 has a compiler 204 and a query processor 208 which process the sequential and iterative source code constructs 250, respectively, and separately output their results for eventual execution. The system 200 has three modes of operations, which are compiling mode, optimizing mode, and execution mode. The compiler 204 is for the sequential language portions of the source code provided by the user, and the query processor 208 manages the query portions within that same source code.

As shown in FIG. 2, the compiler 204 is connected to the virtual machine 232, while the query processor 208 is not. Instead, the query processor 208 is connected to an iterative language processor 216, which is not connected to the virtual machine 232. The language optimizer 216 is aware of the platform upon which the resulting executable code will run.

The compiler creates byte code and sends that byte code to the virtual machine 232, while the query processor 208 and iterative language processor 216 together create iterator data objects 220 and send those iterator data objects 220 to an assigned query executor 228.

The system 200 (and thus not the code-writer) decides in compile-time which portions of the source code are to be processed in sequential mode, and which portions are to be processed in iterative mode. Such a technique is not only useful for compiling and executing imperative-query languages like PL/SQL, but also valuable within environments where extensible markup language (XML) is used.

It is more efficient to compile sequential into byte code for at least three reasons.

1) byte-code is processor and platform independent;
2) compiling into byte code enables use of a debugger for checking on sequential steps in a program, and
3) byte code only needs to be compiled once, is easy to distribute, and can be compiled once for repeated use across multiple processors.

Compiling SQL constructs into byte code can also be achieved. However, byte code evaluation of SQL-like constructs when applied on large data objects is not efficient. Thus, compiling SQL constructs into byte code is not practical.

The integration and interaction between the sequential and iterative execution modes is realized through the iterator objects 220. Unlike sequential processing, where the data is fully computed by the child expression (e.g. the arguments in FIG. 1B) before evaluating the parent expression, the system 200 allows data computed by the child expression to be represented as abstract iterator objects 220. These iterator objects 220 are virtual, and don't contain the data within for example the child expression the iterator objects 220 are representing. Instead, the iterator objects 220 have an assigned query-executor 228, which knows how to fetch the data within the child expression, item by item, but only if needed. If the data is not needed, unnecessary fetching is reduced, thereby achieving significant efficiencies. This is because many SQL constructs contain child expressions which are seldom reached or branched to.

Using iterator data objects 220 allows a child expression to be virtually executed, so that a parent expression can execute without waiting for that child expression. The actual execution of the child expression can be postponed until the parent expression needs the data from the child expression. By that time, the assigned query executor 228 is invoked to fetch the next item of data.

The system 200 thus supports both sequential and iterative modes of processing. As shown in FIG. 2, the sequential portions of the source code 250 are compiled into byte-code and executed on a stack-based virtual machine 232. Meanwhile, the iterative portions of the source code are executed by the assigned query executors 228.

The compiler 204 doesn't take into account the raw data within the source code in performing its tasks. If the raw data source is a database, or the data comes from a potentially infinite input stream, then the compiler 204 assumes that the data is already converted into a representation suitable for a sequential processing. In XML, one possible example of such a representation is a document object model (DOM) tree.

Since the system 200 enables all iterative constructs to also have a sequential definition, within the system 200 all source code is compiled by default in the sequential, not iterative, processing mode. As stated, this is advantageous because the sequential processing mode is superior for program debugging, and is thus more suitable in the early application development stages.

However, when the system 200 is in optimizing mode, the compiler 204 needs knowledge of the various pieces of data that the compiled executable program is about to manipulate. For example, knowing the size of the underlying data and whether the data has specific datatypes, e.g. index-evaluable expressions or not can impact overall performance of the resulting program. To address this, the language optimizer 216 is used as shown in FIG. 2. The declarative language optimizer 216 is invoked when the system 200 is in compile time, to allocate and compile portions of source code in an iterative manner.

SQL deals with large amount of data, and thus sometimes uses indexes to predict or give advance notice of where in a database to find that data. One use of an index is where database tables tell in advance where to look for a specific expression. Accordingly, when compiling a sequential loop logic statement into an iterator object 220, it is possible to use an index probing evaluation. This is also known as a database index scan. Processing the sequential loop logic statement would requiring looping all 1 million times, while using a database index scan, it is only necessary for the resulting executable program to loop perhaps 30 times. The language optimizer 216 is aware of database indexes.

As shown in FIG. 1A, the language optimizer 216 achieves its tasks by starting from the bottom part of the SQL expression (tree), "walks" the tree, and tries to identify the iterative parts of the construct according to the properties of the underlying data. Once the iterative parts are determined, the language optimizer 216 compiles those iterative parts into iterator objects 220, which later are executed (if necessary) in iterative fashion.

The system 200 thus avoids requiring users to specifically specify what part of the source code is sequential, and what part is iterative. Instead, the compiler 204 has a language optimizer 216 to determine such divisions automatically. The decisions of the language optimizer 216 are based on the knowledge of the underlying data that the program manipulates. This knowledge can include the size of the physical data, whether there is an index available to process the data, and potentially other factors.

The virtual machine 232 runs the executable program that results from the compiling process, and in doing so executes the iterator objects 220, thereby achieving seamless integration of the sequential and the iterative part of the resulting executable program.

The system 200 thus enables a single language approach for implementing complex programs such as but not limited to large XML applications, and significantly improves the performance of the resulting executable program.

State and Stateless

Sequential logic differs from iterative in being state versus stateless. Referring to FIG. 1B, after processing argument 1, the state to compute argument 1 is gone. Similarly, after processing argument 2, the state to compute argument 2 is gone. Thus, sequential logic is stateless. Conversely, within a query tree such as that shown in FIG. 1A, a compiler and execution platform cannot forget about the state of "scan", even when processing at the "select" row. Thus, a query tree is not stateless in nature.

Demarcation

Most database products are query-centric and thus use lazy evaluation. However, the non-query non-database software universe is largely sequential/procedure-centric. Within the system 200, there is no need for a user to select a boundary between the two. Within the system 200, it is not necessary to insert programmer-imposed explicit demarcation not alterable by a compiler.

The system 200 avoids requiring boundaries partly by using a hybrid mode of processing (compile-time) and execution (run-time).

Within FIG. 1B, evaluating argument 1 using the iterative processing model, as with SQL, is not possible. This is because the iterative model uses an instruction tree or query plan. However, such instruction trees never actually finish, which means in terms of sequential logic the compiled program will get stuck, and not complete. Accordingly, it is important to cause the execution path to directly return so that the sequential logic can continue on its sequential execution path. The iterator object 220 thus achieves returning of the program flow.

The declarative language optimizer 216 has detailed knowledge of the underlying data, and therefore is in a suitable position to make this decision.

Returning to FIG. 1B, the iterator object 220 enables the system 200 to evaluate argument 1 in a lazy fashion, even when argument 2 is set up to be evaluated in eager fashion. For example, if argument 2 turns out to be zero, and argument 1 was dependent on argument 2 being something other than zero, then the system 200 can entirely ignore argument 1.

Virtual Machine

Another feature of the system 200 is virtual execution, where an expression is activated, initialized, but not necessary executed. This is achieved by the virtual machine 232 shown in FIG. 2.

From the perspective of the virtual machine 232, either byte code or iterator data objects 220 are both equally manageable. This is because the virtual machine 232 executes machine instructions. Each machine instruction has input operands and produces a result. Both the input and the result are data objects of different types: integer, string, sequence, etc. The iterator data object 220 (most common in XML processing) contains items of different scalar types. If fully processed the sequence has all of its data items available immediately.

However, as stated, iterator data object 220 is not fully processed—its data items are produced one at a time by an iterator executor. An iterator data object 220 provides three interface calls: open( ), getnext( ), and close( ). The iterative data object 220 contains pointers to these iterative functions. In order to get these data items, the virtual machine 232 calls three iterator functions—Open( ), GetNext( ), and Close( ).

The virtual machine 232 first opens the iterator data objecting using the open( ) function. When the virtual machine 232 calls the GetNext( ) function, GetNext( ) returns the next data item within the iterator data object 220 until no more data items are left. When no data items are left within the iterator data object, the virtual machine calls the close( ) function. There must be a close( ) with every open( ).

The system 200 builds the virtual machine 232 to execute the executable program that results from the compilation process. If the virtual machine 232 does not have iterator objects, its necessary to fully compute every argument, which is inefficient.

Suppose a query plan is set up for the sequential constructs of FIG. 1B. Within that query plan, suppose the expression 'e' is "sum" or "count", which means that lazy evaluation is not possible, so that it is necessary to evaluate every node. In such a case, the system 200 can delay building of the query plan, and trigger compilation of the query on-the-fly or only if necessary.

Compiler

As stated, the system 200 avoids requiring a user to provide a separation or demarcation between sequential and query source code. Instead, the compiler 204 decides how to process the source code. Further, the language optimizer 216 knows the platform upon which the resulting executable program will be located, and whether such a platform has particular indexes useful for assisting a searching process.

The language optimizer 216 does an analysis of the platform upon which resulting program will be executed, and reports that information to the compiler 204 which then generates the program to have specific features that will run better on that platform. For example, the compiler 204 may decide that a particular FOR loop can be compiled with an iterator object 220, but rest of the source code can be compiled in sequential mode.

The virtual machine 232 then takes the instructions and executes them, but some of the data may be prepared by the iterator object 220. In such a case, the iterator object 220 behaves as if the data were collected in advance, but in fact that data is not necessarily collected in advance. Indeed, the data may never be collected.

It is desired to avoid putting intensive constructs (e.g. plus, minus, recursive) into an iterator object 220. However, eager evaluation of a million-node situation requires loading all million nodes into memory. In such a case, the system 200 will avoid sequential evaluation and instead use lazy evaluation, thereby generating an iterator object 220.

Conversely, there can be instances where an SQL statement is processed more efficiently using the sequential processing, thereby generating byte code, such as the following.

```
while ($i; a; b)
{
    SUM = SUM +$i
}
```

Preserving the above SQL construct as SQL would have required loading the entire execution state into memory, which is huge and may even be infinite. To address this, the system 200 would detect this problem, and then transform the above SQL construct into byte code.

Implementation within a Computer

Figure 3:
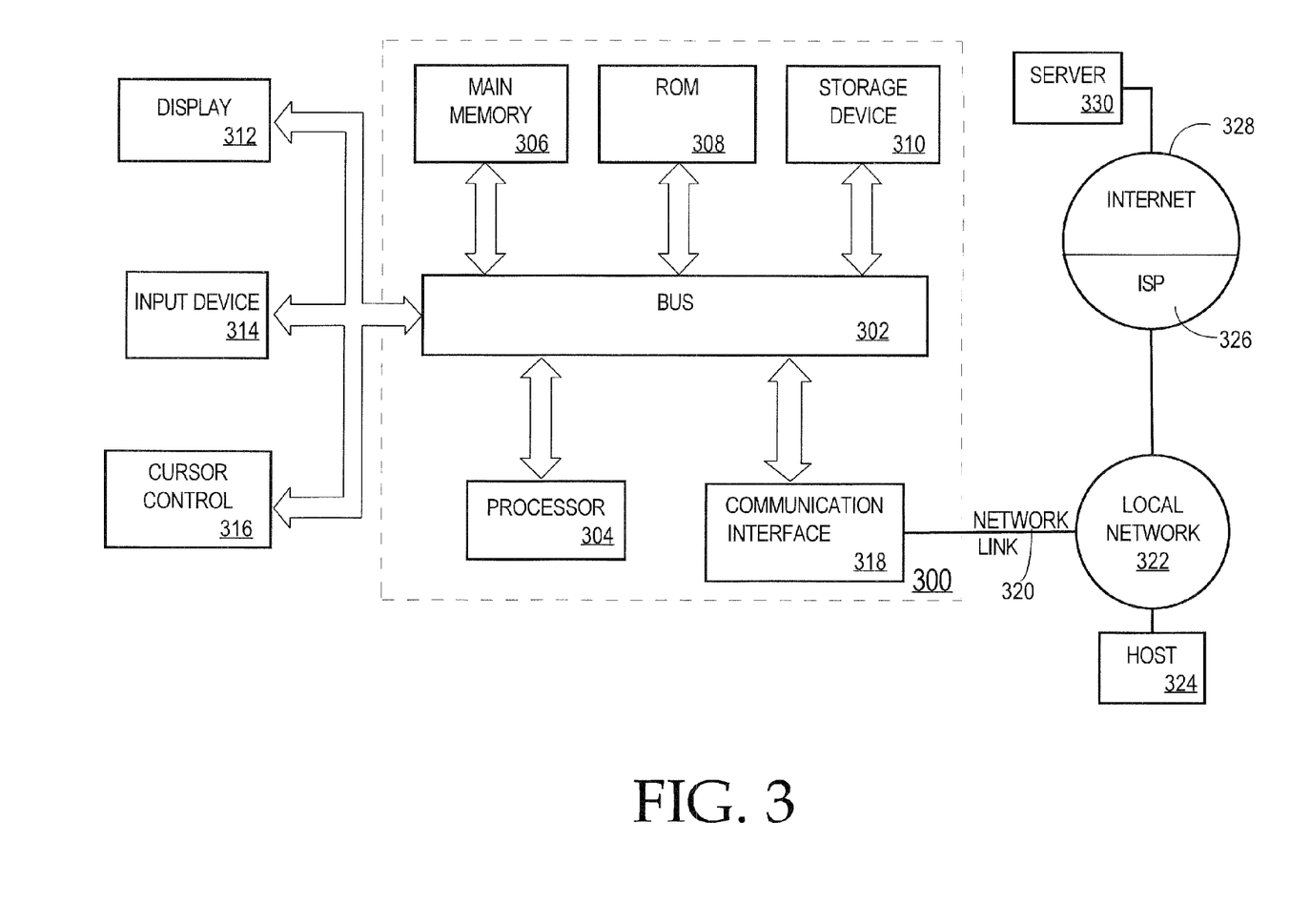
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable storage medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing data that causes a machine to operation in a specific fashion. In an embodiment implemented using computer system 300, various computer-readable storage media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of computer-readable storage media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable storage media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
evaluating a plurality of source code constructs;
based on said evaluation:
determining that a first subset of the plurality of source code constructs is iterative, and
determining that a second subset of the plurality of source code constructs is sequential;
in response to determining that the first subset of the plurality of source code constructs is iterative, compiling the first subset of the plurality of source code constructs into one or more iterator objects;
in response to determining that the second subset of the plurality of source code constructs is sequential, compiling the second subset of the plurality of source code constructs into byte code;
integrating the one or more iterator objects within the byte code, thereby forming an executable program; and
wherein the method is performed by one or more computers.

2. The method of claim 1, further comprising:
a compiler determining a separation between the first subset and the second subset.

3. The method of claim 2, further comprising:
evaluating a platform upon which the executable program will run.

4. The method of claim 1, wherein the source code constructs include one or more constructs that comply with eXtensible Markup Language.

5. The method of claim 1, wherein the one or more iterator objects are virtual, not containing data in any particular child expression, and containing an assigned query executor.

6. The method of claim 5, wherein the assigned query executor contained within the one or more iterator objects being configured for fetching the data within the particular child expression.

7. The method of claim 1, wherein the byte-code is executable by a stack-based virtual machine.

8. The method of claim 1, further comprising:
while in an optimizing mode, a compiler using a language optimizer to evaluate underlying data that the executable program may manipulate.

9. The method of claim 8, further comprising:
determining whether the data has index-evaluable expressions or not.

10. The method of claim 8, further comprising:
invoking a declarative language optimizer in compile time thereby allocating and compiling portions of source code in a iterative manner.

11. The method of claim 8, further comprising:
performing an analysis of a platform upon which the executable program will be executed; and
based on the analysis, generating the program to have specific features customized for the platform.

12. A non-transitory computer-readable medium storing instructions which, when executed by one or more processors, cause the one or more processors to perform the steps of:
evaluating a plurality of source code constructs;
based on said evaluation:
determining that a first subset of the plurality of source code constructs is iterative; and
determining that a second subset of the plurality of source code constructs is sequential;
in response to determining that the first subset of the plurality of source code constructs is iterative, compiling the first subset of the plurality of source code constructs into one or more iterator objects;
in response to determining that the second subset of the plurality of source code constructs is sequential, compiling the second subset of the plurality of source code constructs into byte code; and
integrating the one or more iterator objects within the byte code, thereby forming an executable program.

13. The non-transitory computer-readable medium of claim 12, further comprising:
a compiler determining a separation between the first subset and the second subset.

14. The non-transitory computer-readable medium of claim 13, further comprising:
evaluating a platform upon which the executable program will run.

15. The non-transitory computer-readable medium of claim 12, wherein the source code constructs include one or more constructs that comply with eXtensible Markup Language.

16. The non-transitory computer-readable medium of claim 12, wherein the one or more iterator objects are virtual, not containing data in any particular child expression, and containing an assigned query executor.

17. The non-transitory computer-readable medium of claim 16, wherein the assigned query executor contained within the one or more iterator objects being configured for fetching the data within the particular child expression.

18. The non-transitory computer-readable medium of claim 12, wherein the byte-code is executable by a stack-based virtual machine.

19. The non-transitory computer-readable medium of claim 12, further comprising:

while in an optimizing mode, a compiler using a language optimizer to evaluate underlying data that the executable program may manipulate.

20. The non-transitory computer-readable medium of claim 19, further comprising determining whether the data has index-evaluable expressions or not.

21. The non-transitory computer-readable medium of claim 19, further comprising:

invoking a declarative language optimizer in compile time thereby allocating and compiling portions of source code in a iterative manner.

22. The non-transitory computer-readable medium of claim 19, further comprising:

performing an analysis of a platform upon which the executable program will be executed; and based on the analysis, generating the program to have specific features customized for the platform.

* * * * *

UNITED STATES PATENT AND TRADEMARK OFFICE
CERTIFICATE OF CORRECTION

| | |
|---|---|
| PATENT NO. | : 8,434,076 B2 |
| APPLICATION NO. | : 11/954757 |
| DATED | : April 30, 2013 |
| INVENTOR(S) | : Novoselsky et al. |

It is certified that error appears in the above-identified patent and that said Letters Patent is hereby corrected as shown below:

In the Claims

In column 10, line 12, in Claim 9, delete "comprising:" and insert -- comprising --, therefor.

In column 10, line 30, in Claim 12, delete "iterative;" and insert -- iterative, --, therefor.

Signed and Sealed this
Third Day of September, 2013

Teresa Stanek Rea
*Acting Director of the United States Patent and Trademark Office*